(12) United States Patent
Reisse et al.

(10) Patent No.: US 10,780,525 B2
(45) Date of Patent: Sep. 22, 2020

(54) DEVICE FOR MASK PROJECTION OF FEMTOSECOND AND PICOSECOND LASER BEAMS WITH BLADE, MASK, AND LENS SYSTEM

(71) Applicant: Boegli Gravures SA, Marin-Epagnier (CH)

(72) Inventors: Günter Reisse, Chemnitz (DE); Steffen Weissmantel, Chemnitz (DE); Andy Engel, Colditz (DE); Manuel Pfeiffer, Mittweida (DE); Alexander Kratsch, Mittweida (DE); Charles Boegli, Marin-Epagnier (CH); Matthias Kahl, Marin-Epagnier (CH)

(73) Assignee: Boegli-Gravures SA, Marin-Epagnier (CH)

( * ) Notice: Subject to any disclaimer, the term of this patent is extended or adjusted under 35 U.S.C. 154(b) by 331 days.

(21) Appl. No.: 15/302,792

(22) PCT Filed: May 12, 2015

(86) PCT No.: PCT/IB2015/053494
§ 371 (c)(1),
(2) Date: Oct. 7, 2016

(87) PCT Pub. No.: WO2015/173735
PCT Pub. Date: Nov. 19, 2015

(65) Prior Publication Data
US 2017/0066079 A1 Mar. 9, 2017

(30) Foreign Application Priority Data
May 12, 2014 (EP) .................................... 14167931

(51) Int. Cl.
B23K 26/066 (2014.01)
B23K 26/046 (2014.01)
(Continued)

(52) U.S. Cl.
CPC .......... B23K 26/066 (2015.10); B23K 26/046 (2013.01); B23K 26/0624 (2015.10);
(Continued)

(58) Field of Classification Search
CPC .............. B23K 26/046; B23K 26/0624; B23K 26/0643; B23K 26/0648; B23K 26/066;
(Continued)

(56) References Cited

U.S. PATENT DOCUMENTS 5,007,271 A 4/1991 Boegli
5,359,176 A * 10/1994 Balliet, Jr. ......... B23K 26/1476
219/121.67
(Continued)

FOREIGN PATENT DOCUMENTS

AU 772613 B2 5/2004
CA 2367423 C 9/2000
(Continued)

OTHER PUBLICATIONS

Basting, Dirk, ed. Excimer Laser Technology: laser sources, optics, systems and applications. Lambda Physik, 2001 (Table of Contents and Introduction).
Haehnel et al., "Production of microstructures in wide-band-gap and organic materials using pulsed laser ablation at 157 nm wavelength," Applied Physics A 101 (2010) 491.
International Preliminary Report on Patentability (IPRP) dated Aug. 3, 2016 for PCT/IB2015/053494.
International Search Report dated Sep. 1, 2015 for parent application PCT/IB2015/053494.
(Continued)

*Primary Examiner* — Ibrahime A Abraham
*Assistant Examiner* — Frederick F Calvetti
(74) *Attorney, Agent, or Firm* — Andre Roland S.A.; Nikolaus Schibli

(57) ABSTRACT

The present application relates to a device for the mask projection of femtosecond or picosecond laser beams (2) onto a substrate surface, in which the laser beam (2) consisting of laser beam pulses is, at a location of the optical axis, formed to make laser beam pulses with an expanded laser beam cross section or laser beam pulses with a reduced (Continued)

laser beam cross section and said laser beam (2) has a homogeneous intensity distribution over the laser beam cross section. A stop (6) with a predetermined stop aperture geometry and a mask (7) with a predetermined mask aperture geometry are positioned in succession in the beam (2) path at the location. The device contains a field lens system (8) and an imaging lens (10), which are positioned in such a way that the non-diffracted and diffracted beam components of the laser beam (2) pulses transmitted by the stop (6) and the mask (7) are directed into the imaging lens (10) with a predetermined aperture with the aid of the field lens system (8) in such a way that a reduced image, ac curate in every detail and having a predetermined imaging ratio, of the intensity profile generated by the stop (6) and the mask (7) is generated over the laser beam cross section of the laser beam pulses in the imaging plane. In a beam guiding variant 1, an added lens system (16), the field lens system (8) and the imaging lens (10) are positioned relative to one another in such a way that a focus (19) is generated between the imaging lens (10) and the substrate surface and, in a beam guiding variant 2, the added lens system (16), the field lens system (8) and the imaging lens (10) are positioned relative to one another in such a way that a focus (22) is generated between the field lens system (8) and the imaging lens (10). At least one vacuum cuvette, which surrounds the region of the focus (19) and of the focus (22), is present.

22 Claims, 6 Drawing Sheets

(51) Int. Cl.
*B23K 26/06* (2014.01)
*B23K 26/12* (2014.01)
*B23K 26/0622* (2014.01)
*B23K 26/16* (2006.01)
*B23K 26/14* (2014.01)

(52) U.S. Cl.
CPC ...... *B23K 26/0643* (2013.01); *B23K 26/0648* (2013.01); *B23K 26/127* (2013.01); *B23K 26/1224* (2015.10); *B23K 26/1462* (2015.10); *B23K 26/16* (2013.01)

(58) Field of Classification Search
CPC .............. B23K 26/1224; B23K 26/127; B23K 26/1462; B23K 26/16
See application file for complete search history.

(56) References Cited

U.S. PATENT DOCUMENTS

| | | | |
|---|---|---|---|
| 5,598,774 A | 2/1997 | Boegli | |
| 6,176,819 B1 | 1/2001 | Boegli et al. | |
| 6,262,390 B1* | 7/2001 | Goland | C04B 41/009 219/121.84 |
| 6,333,485 B1* | 12/2001 | Haight | A61B 18/26 219/121.68 |
| 6,507,000 B2* | 1/2003 | Otsubo | B23K 26/1462 219/121.7 |
| 6,665,998 B1 | 12/2003 | Boegli | |
| 6,715,411 B1 | 4/2004 | Boegli | |
| 7,036,347 B2 | 5/2006 | Boegli | |
| 7,147,453 B2 | 12/2006 | Boegli | |
| 7,184,192 B2* | 2/2007 | Sandstrom | B23K 26/032 345/85 |
| 7,229,681 B2 | 6/2007 | Boegli | |
| 7,692,115 B2* | 4/2010 | Sasaki | B23K 26/1476 219/121.84 |
| 7,744,770 B2* | 6/2010 | Doi | H01L 21/6835 216/59 |
| 7,982,169 B2 | 7/2011 | Kittelmann et al. | |
| 8,038,922 B2 | 10/2011 | Boegli | |
| 8,274,735 B2* | 9/2012 | Fry | G01N 21/71 356/244 |
| 8,344,285 B2* | 1/2013 | Sykes | B23K 26/12 219/121.68 |
| 8,430,663 B2 | 4/2013 | Boegli | |
| 8,495,900 B2 | 7/2013 | Boegli | |
| 8,809,732 B2* | 8/2014 | Sykes | B23K 26/12 219/121.68 |
| 8,932,044 B2 | 1/2015 | Boegli | |
| 8,993,919 B2* | 3/2015 | Kusukame | G02F 1/3511 219/121.61 |
| 9,140,834 B2 | 9/2015 | Boegli | |
| 9,156,107 B2 | 10/2015 | Boegli et al. | |
| 9,180,643 B2 | 11/2015 | Boegli | |
| 9,481,141 B2 | 11/2016 | Boegli | |
| 9,505,167 B2 | 11/2016 | Boegli | |
| 9,579,924 B2 | 2/2017 | Boegli | |
| 9,636,885 B2 | 5/2017 | Boegli et al. | |
| 9,809,927 B2 | 11/2017 | Boegli | |
| 9,939,725 B2* | 4/2018 | Boegli | B82Y 10/00 |
| 9,993,895 B2* | 6/2018 | Boegli | B23K 26/0604 |
| 10,083,253 B2 | 9/2018 | Boegli et al. | |
| 10,183,318 B2 | 1/2019 | Boegli et al. | |
| 2002/0008087 A1* | 1/2002 | Clauer | B23K 26/16 219/121.6 |
| 2002/0023907 A1* | 2/2002 | Morishige | B23K 26/1462 219/121.85 |
| 2002/0108398 A1* | 8/2002 | Smith | B23K 26/066 63/32 |
| 2002/0179582 A1* | 12/2002 | Reichmann | B23K 26/0665 219/121.84 |
| 2003/0121896 A1* | 7/2003 | Yu | B08B 7/0042 219/121.68 |
| 2003/0127435 A1* | 7/2003 | Voutsas | B23K 26/1435 219/121.65 |
| 2003/0127441 A1* | 7/2003 | Haight | B23K 26/032 219/121.84 |
| 2004/0112882 A1* | 6/2004 | Miyairi | B23K 26/0853 219/121.86 |
| 2004/0226927 A1* | 11/2004 | Morikazu | B23K 26/123 219/121.84 |
| 2005/0059265 A1* | 3/2005 | Im | B23K 26/0604 438/795 |
| 2005/0225836 A1* | 10/2005 | Sandstrom | B23K 26/032 359/291 |
| 2005/0279147 A1 | 12/2005 | Boegli | |
| 2007/0096103 A1* | 5/2007 | Jyumonji | B23K 26/04 257/64 |
| 2010/0032416 A1 | 2/2010 | Jeong et al. | |
| 2010/0061619 A1 | 3/2010 | Boegli | |
| 2010/0208327 A1* | 8/2010 | Sandstrom | B23K 26/032 359/290 |
| 2012/0018993 A1 | 1/2012 | Boegli et al. | |
| 2012/0213236 A1* | 8/2012 | Lundquist | H01S 3/0604 372/25 |
| 2012/0243094 A1* | 9/2012 | Boegli | B44B 5/026 359/567 |
| 2012/0292821 A1 | 11/2012 | Boegli | |
| 2013/0140287 A1* | 6/2013 | Sykes | B23K 26/12 219/121.72 |
| 2014/0059977 A1 | 3/2014 | Boegli | |
| 2016/0074968 A1* | 3/2016 | Souter | B23K 26/009 |
| 2016/0075077 A1 | 3/2016 | Boegli et al. | |
| 2017/0066079 A1 | 3/2017 | Reisse et al. | |
| 2017/0085054 A1* | 3/2017 | Schulz | H01S 3/2366 |
| 2017/0282635 A1 | 10/2017 | Boegli | |
| 2018/0220698 A1 | 8/2018 | Boegli et al. | |
| 2018/0370175 A1 | 12/2018 | Boegli et al. | |

FOREIGN PATENT DOCUMENTS

| | | |
|---|---|---|
| CA | 2382597 A1 | 11/2000 |
| DE | 202017105458 U1 | 10/2017 |

(56) References Cited

FOREIGN PATENT DOCUMENTS

| | | |
|---|---|---|
| EP | 2653301 A1 | 4/1988 |
| EP | 2336823 A1 | 6/2011 |
| EP | 2572820 A1 | 3/2013 |
| EP | 3300612 A1 | 4/2018 |
| EP | 3415306 A1 | 12/2018 |
| JP | 2003211278 A | 7/2003 |
| RU | 1508468 A1 | 1/1995 |
| RU | 2401185 C2 | 10/2010 |
| RU | 2440084 C2 | 1/2012 |
| WO | WO 2007/012215 | 2/2007 |
| WO | WO 2010/111798 | 10/2010 |
| WO | WO 2017208092 | 12/2017 |

OTHER PUBLICATIONS

Laskin et al., "πShaper—Refractive Beam Shaping Optics for Advanced Laser Technologies," Journal of Physics: Conference Series 276 (2011) 012171.

Written Opinion of the International Search Authority dated Sep. 1, 2015 for parent application PCT/IB2015/053494.

Russian Patent Office Search Report for RU201614755 dated Nov. 8, 2018.

Hernandez-Rueda, J., Siegel, J., Puerto, D., Galvan-Sosa, M., Gawelda, W., & Solis, J. (2013). Ad-hoc design of temporally shaped fs laser pulses based on plasma dynamics for deep ablation in fused silica. Applied Physics A, 112(1), 185-189.

* cited by examiner

DEVICE FOR MASK PROJECTION OF FEMTOSECOND AND PICOSECOND LASER BEAMS WITH BLADE, MASK, AND LENS SYSTEM

CROSS REFERENCE TO RELATED APPLICATIONS

The present application is a U.S. national stage application of PCT/IB2015/053494 filed on May 12, 2015 designating the United States, and claims foreign priority to European patent application EP 14167931.6 filed on May 12, 2014, the contents of both documents being herewith incorporated by reference in their entirety.

TECHNICAL FIELD

The invention relates to a device for mask projection of femtosecond and picosecond laser beams

PRIOR ART

Methods and devices for mask projection of excimer laser beams are already known and used for microstructuring of solid-state surfaces and, in particular, for generating three-dimensional microstructures by way of a structured, layer-by-layer material ablation with the aid of excimer lasers as well (see, inter alia, Excimer laser technology, Ed. Dr. Dirk Basting, Lambda Physik AG Göttingen 2001, ISBN 3-00-006395-1, and Weissmantel, S.; Reisse, G.; Haehnel, F.; Bertram, R.; Boettcher, R.; Production of microstructures in wide-band-gap and organic materials using pulsed laser ablation at 157 nm wavelength; Applied Physics A 101 (2010) 491.). In these methods, the laser beam, which is emitted by an excimer laser with a wavelength of 157 nm, 193 nm, 248 nm, 308 nm or 351 nm and has a virtually rectangular cross section, an inhomogeneous intensity distribution over the laser beam cross section and a short coherence length and therefore cannot be used for the purposes of microstructuring without further beam forming, is formed by way of a homogenizer, which decomposes the laser beam into a predetermined number of partial beams and preferably overlays these once again, and a field lens element into a laser beam with a predetermined square laser beam cross section with a homogeneous intensity distribution (top flat intensity profile) at the so-called homogeneous spot at the location P in the beam propagation direction. A mask with a predetermined geometry of the transmitting mask regions is positioned at this location P. By using this mask, the intensity profile over the laser beam cross section required for the microstructure to be generated, e.g. a grid-shaped intensity profile, is formed from the homogeneous intensity distribution of the laser beam at the homogeneous spot and imaged with a predetermined reducing imaging ratio on the substrate to be structured by way of focussing optics suitable for the excimer laser wavelength. The geometric form of the transmitting area or the aperture of a stop, which is arranged at a small distance upstream or downstream of the mask or preferably arranged in contact with the latter, in this case generates the cross-sectional geometry (outline form) of the intensity profile of the laser beam formed by the mask (see e.g. the publications WO2010111798 and EP 2 336 823 A1). The minimal structure dimensions achievable by means of the excimer laser mask projection method lie in the region of a few micrometres.

The search by the inventors has not yielded any further comparable methods and devices for the mask projection of femtosecond laser beams and picosecond laser beams. Femtosecond lasers (fs lasers) and picosecond lasers (ps lasers) emit laser beams with central wavelengths predominantly in the range from 775 nm to 1064 nm, with a substantially Gaussian intensity distribution over the laser beam cross section and with a substantially greater coherence length than the excimer lasers. These fs and ps laser beams are formed by means of commercially available focussing optics to make beams with a small focus cross section and are, for example, also used for microstructuring of solid-state surfaces. In this focussing method, the intensity distribution over the focus cross section of the laser beam is consequently likewise Gaussian and not homogeneous; the intensity at the location of the Gaussian radius is only 1/e-times, i.e. 36.8%, the value at the beam centre and the intensity at the location of the beam radius is only $1/e^2$-times, i.e. 13.5%, the value at the beam centre.

In order to generate a more homogeneous intensity distribution over the focus cross section of fs and ps laser beams, beam homogenizers, which are arranged between the laser output and focussing optics, have been developed. In the previously known beam homogenisers for fs and ps laser beams (see e.g. A. Laskin and V. Laskin, πShaper—Refractive Beam Shaping Optics for Advanced Laser Technologies in Journal of Physics: Conference Series 276 (2011) 012171), part of the fluence is transported from the inner part of the beam cross section to the outer part of the beam cross section by means of a refractive lens system such that a more homogeneous intensity distribution is generated over the laser beam cross section downstream of the beam homogenizer; however, a flat top intensity profile over the whole beam cross section was only achieved approximately until now.

The focal radius of the laser beam with the Gaussian distribution is a function of the wavelength, the radius of the raw beam emitted by the laser and the focal distance, and it cannot be reduced arbitrarily. By way of example, in an FS-150-10 fs laser microstructuring apparatus by 3D-Micromac AG, Chemnitz, Germany with a CPA 2010 laser by Clark Inc., USA, having a central wavelength of 775 nm, 1 mJ (1 millijoule) pulse energy and 150 fs pulse duration, the smallest Gaussian focal radius is 5.7 µm with a lens with a 32 mm focal length, despite twofold beam expansion, from a 3 mm Gaussian radius to 6 mm, and homogenization.

Disadvantages of the Known fs and ps Focussing Methods

The achievable focal radii of at least a few micrometres are too large for a multiplicity of applications in the field of microstructuring and nanostructuring; structure dimensions of a few micrometres (µm) and less are not achievable. By way of example, the edge sharpness of the microstructures generated by means of the focussing method with dimensions of up to several ten micrometres is too low, even in the case of a pulse overlay of the laser beam. Optically effective transmission and reflection gratings with grating constants up to one micrometre and less for the visible wavelength range cannot be produced e.g. with the aid of the focussing method.

As a result of the Gaussian intensity distribution over the laser beam cross section, the ablation depths over the focal cross section and therefore over the width of a structured track are substantially larger in the track centre than at the track edge. By way of example, this leads to a high surface roughness, even in the case of a track overlap, in the case of the meandering line scan of the focussed laser beam for generating a planar material ablation. In the case of microstructuring and in the case of separating layer stacks consisting of several sublayers made of different materials with a thickness of a few nanometres, this intensity distribution for example leads to the incomplete layer ablation at the track edges or to the damage of the substrate material at the track centre. In the case of track widths that are greater than 10 micrometres, this disadvantage can be partly rectified by the use of a beam homogenizer; however, smaller track widths up to one micrometre and less and with a uniform ablation depth cannot be achieved with the aid of the focussing method.

The generation of a predetermined structured intensity profile over the laser beam cross section is not possible in the focussing method.

SUMMARY OF THE INVENTION

Using the solution according to the invention, the disadvantages of the previously used fs and ps focussing methods should be overcome. In particular, what is intended to be achieved is a homogeneous intensity distribution over the whole imaging cross section on the substrate surface (workpiece surface) to be processed and, compared to the focal cross sections which can be set with the focussing method, substantially smaller imaging cross sections, for example a circular imaging cross-sectional area with a diameter of 1 µm or a 1 µm² square imaging cross-sectional area in the case of central laser beam fundamental wavelengths preferably in the range from 775 nm to 1064 nm, or even smaller cross sections, e.g. in the range of a few 100 nanometres, when using frequency doubling (SHG) or frequency tripling (THG) or frequency quadrupling (FHG) of the laser beam.

In the case of a sufficiently high pulse energy of the fs and ps laser of at least 1 mJ and in the case of a possible adjustable cross-sectional area of the homogeneous spot, which results therefrom and which is also dependent on the beam intensity required for the structuring and on the imaging ratio, it should moreover also be possible to form, from the homogeneous intensity distribution of the laser beam, the intensity profile over the laser beam cross section which is required for generating a predetermined microstructure, e.g. a grating-shaped intensity profile, with the aid of a mask which is positioned in the homogeneous spot and has a predetermined geometry of the transmitting mask areas, and it should be possible to image same on the substrate to be structured by means of suitable focussing optics with a predetermined reducing imaging ratio.

The solution according to the invention contains a device for the mask projection of femtosecond and picosecond laser beams onto a substrate surface, in which the laser beam consisting of laser beam pulses is, at a location of the optical axis, formed to make laser beam pulses with an expanded laser beam cross section or laser beam pulses with a reduced laser beam cross section and said laser beam has a homogeneous intensity distribution over the laser beam cross section. A stop with a predetermined stop aperture geometry and a mask with a predetermined mask aperture geometry are positioned in succession in the beam path at the location. The device furthermore contains a field lens system and an imaging lens, which are positioned in such a way that the non-diffracted and diffracted beam components of the laser beam pulses transmitted by the stop and the mask are directed into the imaging lens with a predetermined aperture with the aid of the field lens system in such a way that a reduced image, accurate in every detail and having a predetermined imaging ratio, of the intensity profile generated by the stop and the mask is generated over the laser beam cross section of the laser beam pulses in the imaging plane. In a beam guiding variant 1, an added lens system, the field lens system and the imaging lens are positioned relative to one another in such a way that a focus 1 is generated between the imaging lens and the substrate surface and, in a beam guiding variant 2, the added lens system, the field lens system and the imaging lens are positioned relative to one another in such a way that a focus 2 is generated between the field lens system and the imaging lens. At least one vacuum cuvette, which surrounds the region of the focus 1 and of the focus 2, is present.

In a further preferred embodiment, a 90° deflection mirror is arranged between the field lens system and the imaging lens.

In a further preferred embodiment, means for varying the distance between the principal plane of the imaging lens and the substrate surface are present, with the aid of which the predetermined position of the imaging plane, which is defined as a distance of the image distance from the principal plane of the imaging lens, is selectively placed over, on or under the substrate surface by varying the distance between the principal plane of the imaging lens and the substrate surface.

In a further preferred embodiment, the means for varying the distance between the principal plane of the imaging lens and the substrate surface is the z-axis of the xyz-coordinate table, to which the substrate is fastened.

In a further preferred embodiment, the means for varying the distance between the principal plane of the imaging lens and the substrate surface are the linear axes, with the aid of which the field lens system fastened to these linear axes and the imaging lens are arranged in a manner displaceable by a predetermined path along the optical axis.

In a further preferred embodiment, in the beam guiding variant 1, a cross jet inert gas nozzle is arranged between the at least one vacuum cuvette and the substrate surface.

In a further preferred embodiment, in the beam guiding variant 2, an inert gas nozzle system is attached between the imaging lens and the substrate surface.

In a further preferred embodiment, the apertures of the optical components, which comprise at least the field lens system, the imaging lens and the at least one vacuum cuvette, are selected to be so large that, from the first to at least the third order of diffraction, even the laser beam components which were diffracted as a result of the predetermined mask aperture geometry of the mask are also imaged on the substrate surface.

In a further preferred embodiment, the employed laser is operated in the burst mode.

In a further preferred embodiment, the device furthermore comprises a beam expander or a beam cross section reducer; and a device, positioned between the laser and the beam expander or beam cross section reducer, for generating the second harmonic (frequency doubling, SHG) or the third harmonic (frequency tripling, THG) or the fourth harmonic (frequency quadrupling, FHG). The femtosecond laser beam pulses or the picosecond laser beam pulses respectively pass through the device for generating the second harmonic (frequency doubling, SHG) or the third harmonic (frequency tripling, THG) or the fourth harmonic (frequency quadrupling, FHG) after emerging from the laser and at least one of the beam expander or beam cross section reducer, the added lens system, the stop, the mask, the field lens system, the imaging lens and the at least one vacuum cuvette have a design suitable for the transmission of the generated photon radiation with half or a third or a quarter of the fundamental wavelength.

BRIEF DESCRIPTION OF THE DRAWINGS

The invention will be explained in more detail below on the basis of schematic drawings.

DESCRIPTION OF THE SOLUTION ACCORDING TO THE INVENTION

Figure 1:
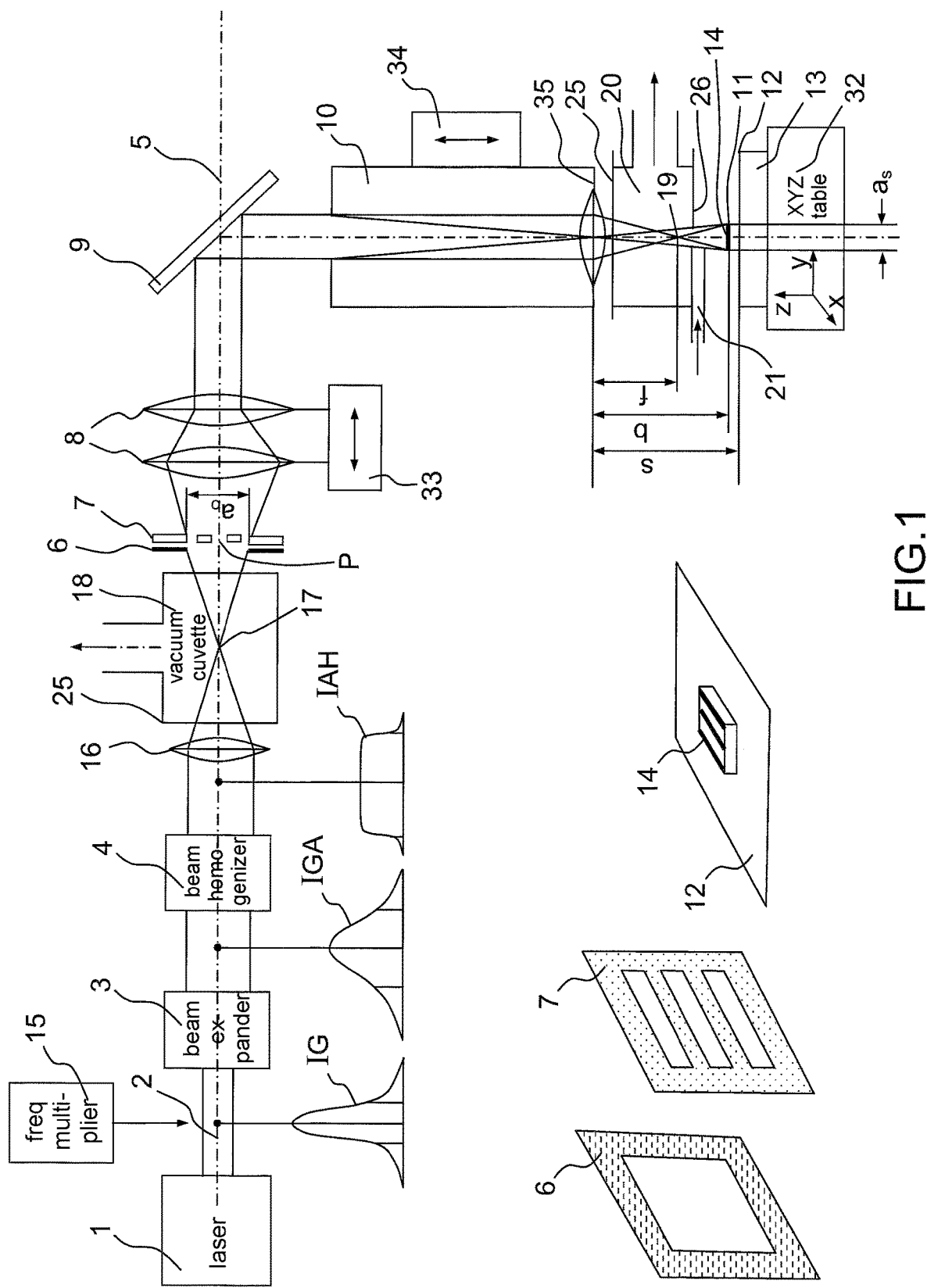
FIG. 1 shows the schematic arrangement of the optical components of the beam guiding and shaping system for realizing the femtosecond and picosecond laser mask projection method (fspsMP)

Arrangement of the Optical Components:

In accordance with FIG. 1, the pulsed laser beam (2) of a femtosecond or picosecond laser with an approximately Gaussian intensity distribution over the laser beam cross section (IG) is formed, with the aid of at least one beam expander (3), after its emergence from the laser (1) into a laser beam with still an approximately Gaussian intensity distribution, but with an enlarged cross section (IGA).

Thereupon, the laser beam passes a beam homogenizer (4) and, optionally, an added lens element or an added lens system (16) as well, which, at the homogeneous spot at the location (P) on the optical axis (5) of the laser beam (beam axis), generate a homogeneous intensity distribution (IAH), referred to as a top-flat intensity profile, of the laser beam.

In order to generate a predetermined structured intensity profile of the laser beam pulses over the laser beam cross section, a stop (6) with a predetermined stop aperture geometry and a mask (7) with a predetermined mask aperture geometry are positioned in succession, either with a very small distance of up to a few tenths of a millimetre between them or in direct contact with one another, at the location (P). The non-diffracted and diffracted beam components of the laser beam pulses transmitted by the stop (6) and the mask (7) positioned at the homogeneous spot at the location (P) are imaged in the imaging plane (11) with the aid of a field lens element or a field lens system (8) and, after the reflection at, at least one 90° deflection mirror (9), a lens (10). A reduced image (14), accurate in every detail and having a predetermined imaging ratio ($V=a_O/a_S$:1), of the predetermined structured intensity profile over the laser beam cross section, as generated by the stop and the mask, is generated in the imaging plane (11), the predetermined position of which at a distance of the image distance (b) from the principal plane (35) of the lens (10) is placed selectively over (see FIG. 1), but preferably on or under, the substrate surface (12) by varying the distance (s) between the principal plane (35) of the lens (10) and the surface (12) of the substrate (13).

The variation of the distance (s) between the principal plane (35) of the imaging lens (10) and the substrate surface (12) is preferably implemented with the aid of the z-axis of the xyz-coordinate table (32), on which the substrate (13) is positioned. In the case of a non-displaceable substrate, the variation of the distance (s) can also be implemented with the aid of the linear axes (33, 34), to which the field lens element or the field lens system (8) and the lens (10) are fastened and which are therefore displaceable by a predetermined path along the optical axis (5) without the imaging properties of the optical system changing.

The increase in the cross section of the laser beam which can be implemented by means of the beam expander (3), the cross section of the laser beam at the homogeneous spot in the plane of the mask (7) resulting from this increase in the cross section and the focal distance (focal length) of the added lens element or the added lens system (16) and the implementable imaging ratio V depend on the pulse energy of the laser beam and must be matched to one another in such a way that the laser beam fluence required for the planned laser processing process is obtained in the imaging plane (11). A beam cross section reducer must be used in place of the beam expander (3) if the beam emitted by the laser has a pulse energy that is too low such that the fluence is too small in the plane of the mask (7) for obtaining the necessary fluence for ablating material in the imaging plane (11) in the case of a predetermined imaging ratio V. This may, for example, be necessary in the case of frequency doubling (SHG) or frequency tripling (THG) or frequency quadrupling (FHG) of the fundamental wavelength of the laser beam with the aid of the optional device (15); by way of example, when doubling the frequency of the CPA 2010 laser by Clark Inc. with a central fundamental wavelength of 775 nm, only approximately 40% of the original pulse energy of the laser beam with the fundamental wavelength is available and, if the frequency is tripled, it is only approximately 6-8%. The usable mask area would then be very small, but it would suffice to generate, with a small stop aperture or mask aperture, i.e. with a very small imaging cross section of, for example, 1 $\mu m^2$ and less on the substrate, very fine bores and precise structure edges and also, in the case of layer-by-layer structured material ablation, very small three-dimensional microstructures (3D structures).

There can only be an image (14) of the intensity profile generated by the stop (6) and the mask (7) over the laser beam cross section, which image is accurate in every detail and reduced by a predetermined imaging ratio (V), and hence there can only be the generation of predetermined microstructures with the aid of the fs and ps mask projection method, if the laser beam components diffracted at the transmitting mask regions, e.g. at a line grating mask, also reach the imaging plane (11) and contribute to the imaging because information is otherwise lost and the transmission geometry of the mask, and hence the predetermined structured intensity profile of the laser beam generated by the mask, is only imaged imprecisely in the imaging plane. Therefore, all optical components arranged downstream of the mask (7) must have a sufficiently large aperture so that the diffracted laser beam components are also imaged and are also able to contribute to the imaging. Simulation calculations and experiments have shown that there must also be imaging from the first order of diffraction up to at least the third order of diffraction in order to obtain an image, accurate in every detail, of the intensity profile of the laser radiation, generated by the mask, in the imaging plane (11).

Figure 2:
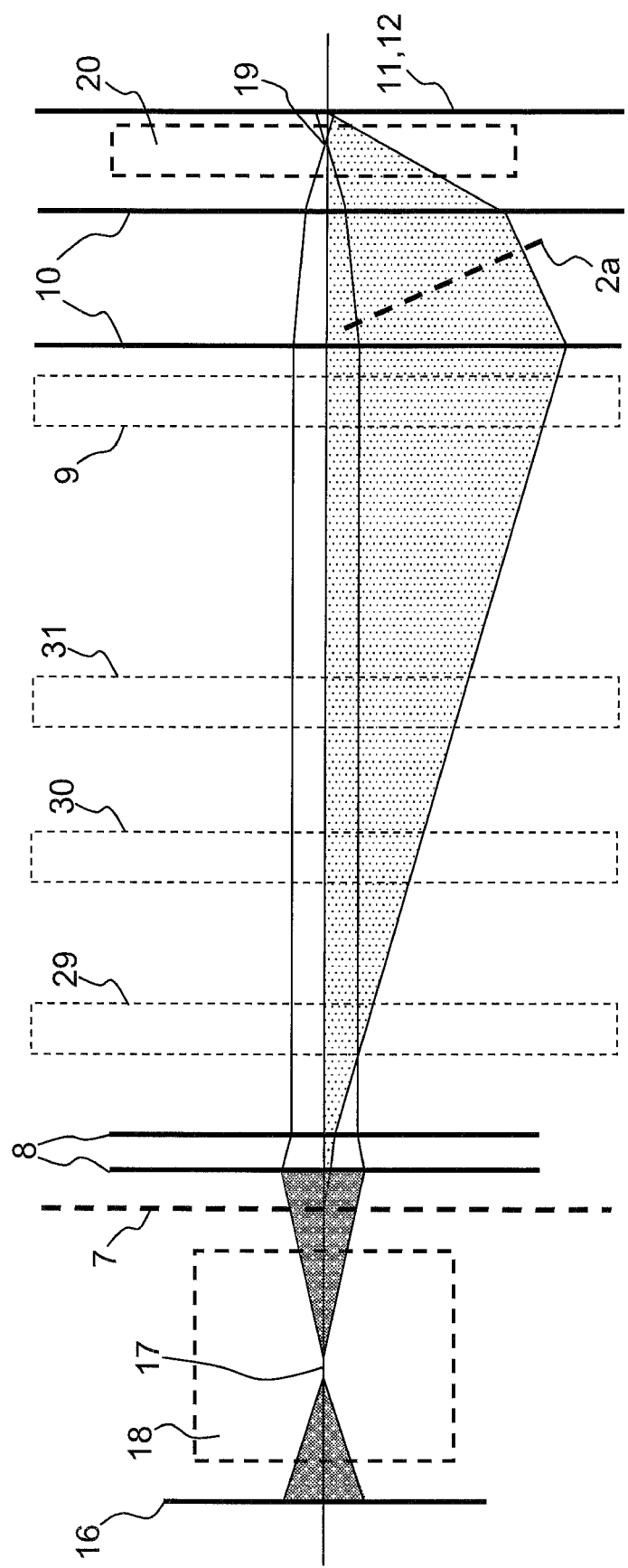
FIG. 2 shows the calculated optical path of the laser beams in the beam guiding and shaping system in accordance with FIG. 1 for the beam guiding variant 1 with the focus locations between the added lens element (16) and the mask (7) and between the lens (10) and the substrate (13)
Figure 3:
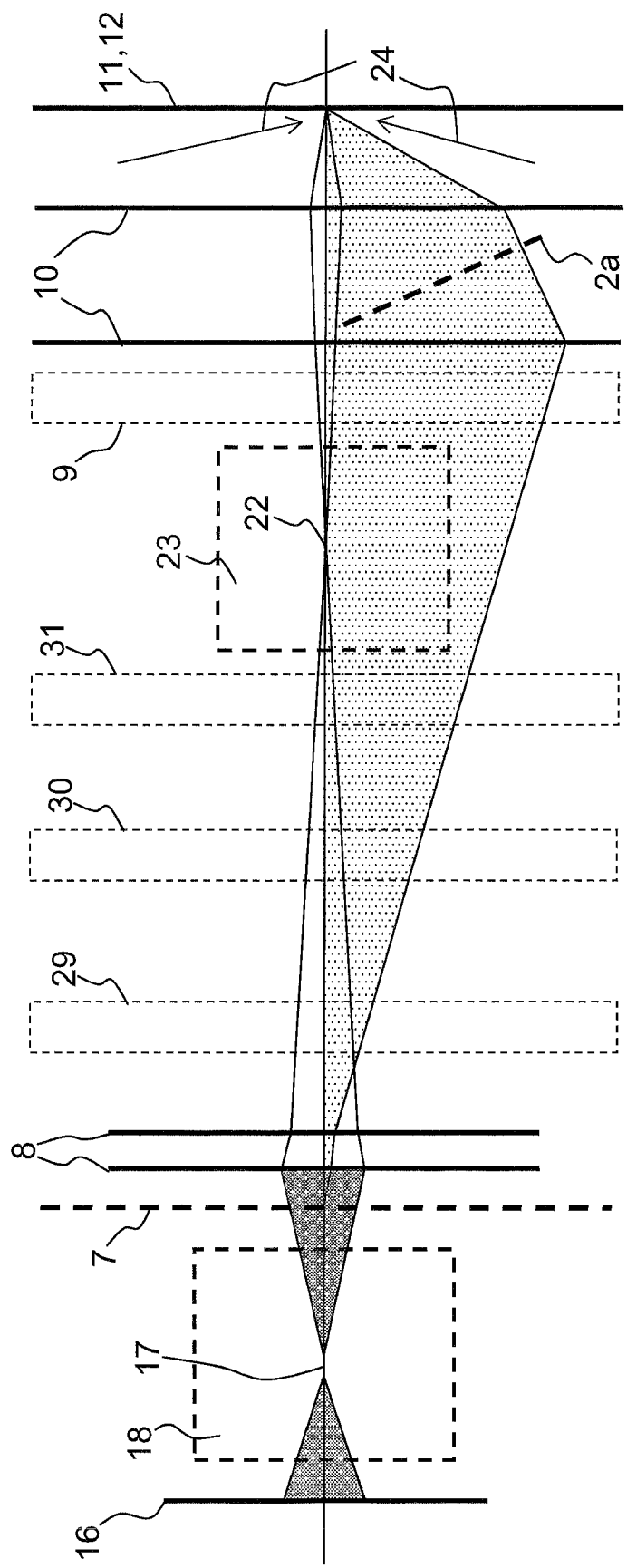
FIG. 3 shows the calculated optical path of the laser beams in the beam guiding and shaping system in accordance with FIG. 1 for the beam guiding variant 2 with the focus locations between the added lens element (16) and the mask (7) and between the field lens system (8) and the lens (10)

The high photon densities in the laser beam foci of fs and ps laser beams lead to the generation of intensive air plasmas or plasmas of the inert gas, used in the beam path for protecting the optical components from contamination, in the focal regions of the beam guiding and forming system (see also FIGS. 2 and 3). These laser-induced plasmas cause an absorption and scattering of laser beam components with the following effects: the plasma ignited by the intermediate focus (17) in the beam path of the laser beam between the beam homogenizer (4) and the mask (7) reduces the homogeneity of the fluence distribution of the laser beam in the plane of the mask (7) and the plasma ignited by the focus 1 (19) at the focal distance (f) of the lens (10), or the plasma ignited by the focus 2 (22) between the field lens system (8) and the lens (10), leads to a reduction in the quality of the imaged mask aperture geometry, e.g. to a reduction in the sharpness of edges, in the imaging plane (11), and so there is no homogeneous material ablation on the substrate (13) in the regions predetermined by the aperture geometries of the mask (7). Therefore, these plasmas influence the optical quality of the subsequent laser beam components, in particular at high pulse repetition frequencies (repetition rates) of the laser, and cause a reduction in the accuracy of the details of the imaging and hence also of the generated microstructures.

In order to avoid the occurrence of these plasmas, vacuum cuvettes (18, 20, 23) are inserted into the beam path in the region of the foci (17, 19, 22). These cuvettes surround the focal region, comprise two windows (25), which are coated with transmitting interference layer systems, or one window (25) and one pinhole aperture (26), for virtually lossless transmission of the laser radiation, are evacuated to at least a pre-vacuum and must be included in the calculation of the overall optical system. Alternatively, the whole optical system, starting at the output of the laser (1) and reaching to the imaging lens (10), can also be positioned in a vacuum chamber.

A special operating mode, previously developed for selected ps laser types, is the "burst mode". In contrast to the individual pulse operation of a ps laser with a predetermined repetition rate, it is not ps laser beam pulses that are generated in the "burst mode", but rather ps laser beam bursts with temporal pulse-to-pulse spacings of the individual pulses in the train ("burst") in the region of several ten nanoseconds, typically 20 ns, and with temporal burst-to-burst spacings in the region of $10^{-3}$ to $10^{-7}$ seconds, typically 10 µs, i.e. with a burst repetition frequency (repetition rate of the laser) of 1 kHz to 10 MHz. The maximum possible repetition rate of the ps laser in the "burst mode" depends on the number of individual pulses in the burst and is limited thereby. The pulse duration of the individual pulses of the ps laser and the pulse durations of the pulses in the "burst mode" are equal. A pulse train ("burst") can, in an adjustable manner, consist of up to 20 individual ps pulses. Here, the pulse energy of the individual pulses in the burst can reduce exponentially in accordance with a function typical for the laser instrument in the case of the same pulse-to-pulse spacing of the individual pulses in the burst (e.g. burst of the ps "Lumera Hyperrapid" laser by "Lumera Laser GmbH") or the profile of the pulse energy of the individual pulses in the burst can be predetermined such that an unchanging pulse energy of the pulses in the burst or a reduction or an increase in the pulse energy of the pulses in the burst or else initially a reduction and then again an increase in the pulse energy of the pulses in the burst are possible; furthermore, it is also possible to suppress a pulse or a plurality of pulses in the burst (e.g. in the "FlexBurst™-Mode" in the "Time-Bandwidth Duetto™" and "Time-Bandwidth Fuego™" laser types by "Time-Bandwidth Products"). Frequency doubling or frequency tripling (SHG or THG) of the laser radiation is also possible in the "burst mode" operation of the ps laser. Compared to ps laser processing with individual pulses, the "burst mode" processing has the following advantages:

higher ablation rates when structuring metallic workpieces compared to ps pulse irradiation using individual pulses with the same energy as burst overall energy, i.e. in the case where the fluences of the individual pulses and the bursts are equal, and in the case of the same pulse-to-pulse distance (degree of overlap) of the individual pulses and the bursts, i.e. in the case of the same repetition rate of the individual pulses and the burst repetition rate;

better quality, in particular lower surface roughness, of the generated structure forms in metallic workpieces compared to ps pulse irradiation with individual pulses in the case of the same degree of overlap, even in the case of higher fluences of the "burst".

The generation of the "burst mode" of femtosecond laser beam pulses is currently still at the stage of basic research (e.g. J. Hernandez-Ruedal, J. Siegel, D. Puerto2, M. Galvan-Sosa, W. Gawelda3, and J. Solis: Ad-hoc design of temporally shaped fs laser pulses based on plasma dynamics for deep ablation in fused silica, Appl. Phys. A (2013) 112).

Beam Guiding Variant 1 in the Beam Guiding and Forming System

In the beam guiding variant 1 in accordance with FIG. 2, use is made of an added lens element (16), a field lens system (8) for example consisting of two lens elements, and a lens (10) for example consisting of two lens elements. FIG. 2 only depicts the principal planes of the lens elements. The intermediate focus (17) of the beam path is situated between the added lens element (16) and the stop/mask combination (6, 7). The focus 1 (19) of the imaging optical system consisting of the field lens system (8) and the lens (10) is situated between the lens (10) and the substrate surface (12); the imaging plane (11) is situated on the substrate surface (12). The coloured region (2a) illustrates the propagation of the diffracted laser beam components of the first to fifth order of diffraction of an fs laser beam with a central wavelength of 775 nm, which components emanate e.g. from the centre of a line grating mask (7) with a grating period of 200 µm for generating a beam intensity profile in accordance with (14) in FIG. 1, but with a larger number of slits (not depicted in FIG. 1) for transmitting and diffracting the radiation. The vacuum cuvette 1 (18) surrounds the intermediate focus (17) and the vacuum cuvette 2 (20) surrounds the focus 1 (19). The imaging plane (11) is situated on the substrate surface (12). The rectangles depicted by dotted lines indicate further 90° deflection mirrors (29, 30, 31), which can be used for folding the beam path and increase the compactness of the whole beam guiding and forming system (see FIG. 5). However, if a sufficiently long space is available, the whole optical system can also be implemented without the deflection mirrors (9, 29, 30, 31).

Figure 4A:
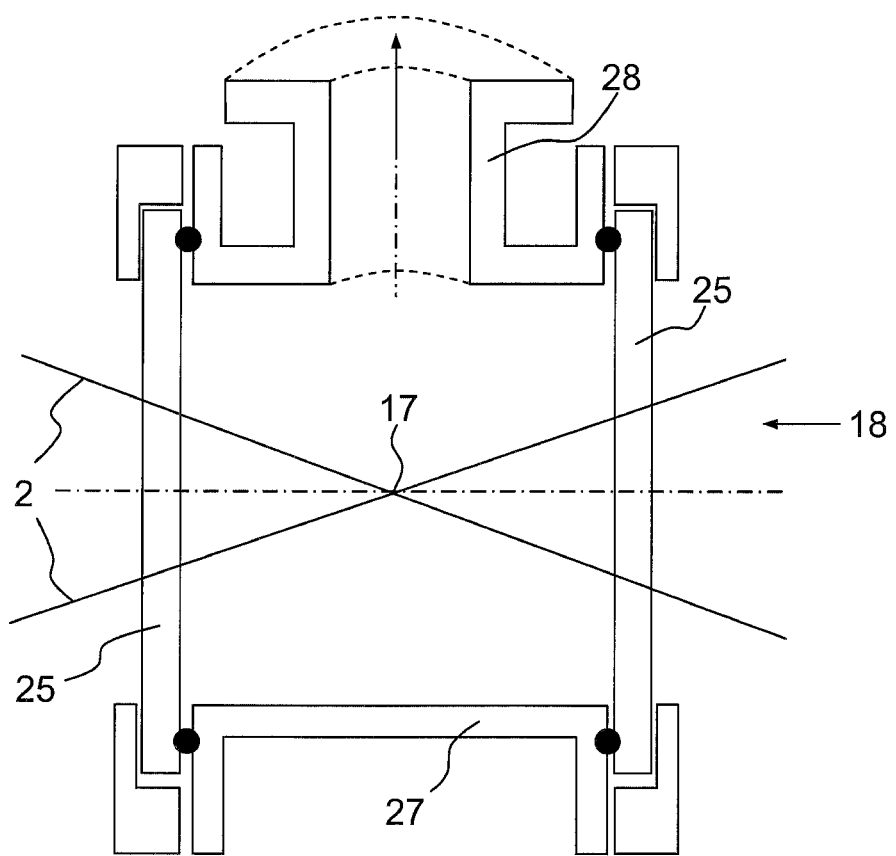
FIG. 4a schematically shows the cross section of the vacuum cuvette 1, which is arranged between the added lens element (16) and the mask (7), and of the similar vacuum cuvette 3, which is arranged between the field lens system (8) and the lens (10)

The vacuum cuvette 1 (18) schematically depicted in FIG. 4a consists of two interchangeable plane parallel circular windows (25) made of a material transparent to the laser wavelength, and a hollow cylindrical spacer (27), which comprises a flange (28) for connecting a vacuum pump. The windows are fastened to the spacer in a vacuum-tight manner. The vacuum cuvette 1 (18) is positioned in such a way that the laser beam focus (17) is situated in the centre thereof. In order to keep the beam exposure of the windows (25), which are coated on both sides with an interference layer system which transmits the laser wavelength, as low as possible, the distance between the window inner surfaces is at least 100 mm parallel to the optical axis.

Figure 4B:
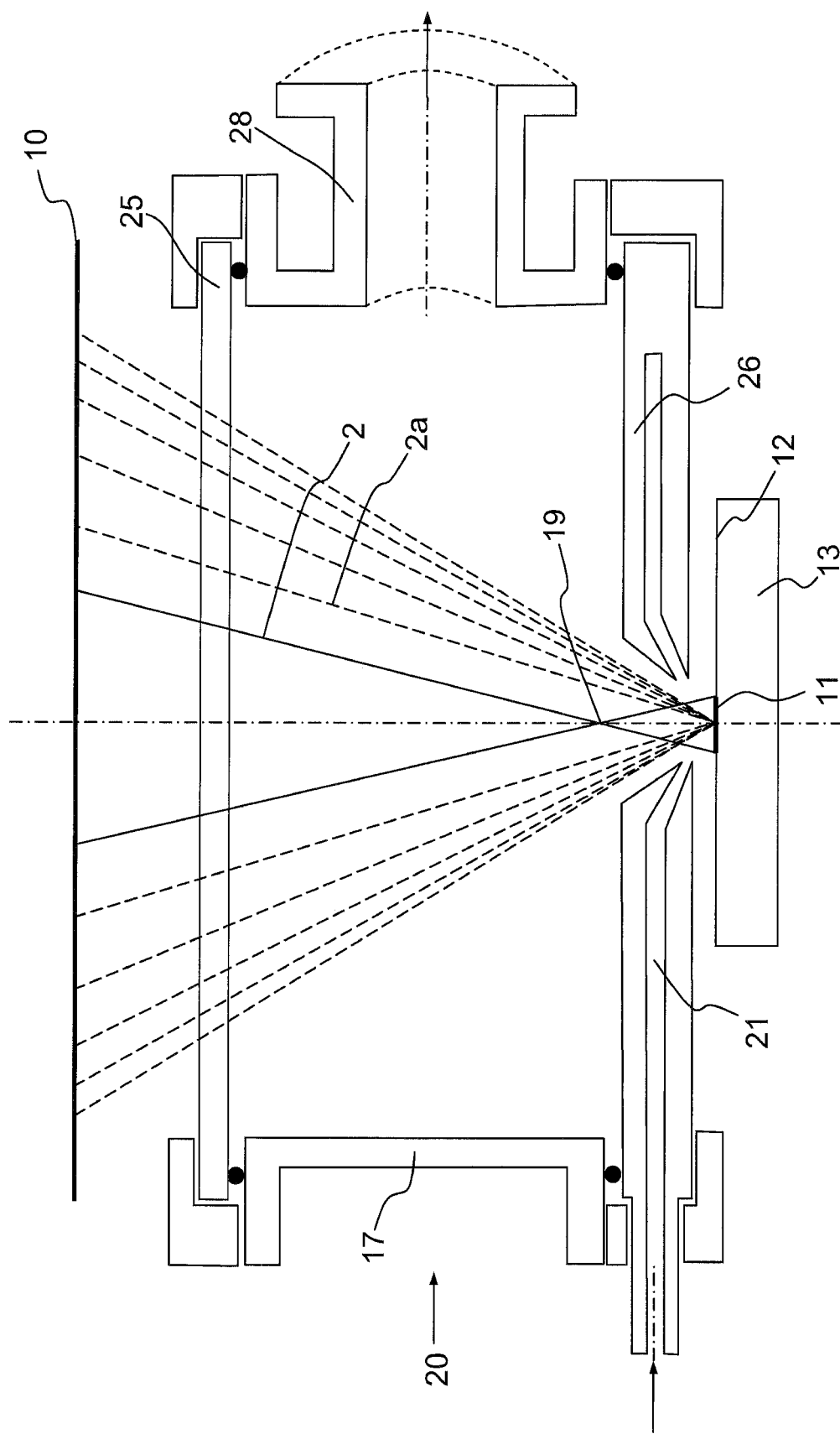
FIG. 4b schematically shows the cross section of the vacuum cuvette 2, which is arranged between the lens (10) and the substrate (13), with an attached cross jet inert gas nozzle (21)

The vacuum cuvette 2 (20) schematically depicted in FIG. 4b only has one transmitting window (25) for transmitting the laser radiation coming from the lens; the diameter of the transmitting window surface must be selected to be so large that the propagation of at least the first to third order of diffraction of the diffracted laser beam components (2a) (see FIG. 2) is also possible without hindrance.

A disc with a pinhole aperture (26) for the transmission of the laser radiation is inserted in place of the window for the emergence of the laser radiation after the focus in the direction of the substrate surface (12); this is because the intensity of the laser radiation in this region may lie over the destruction threshold of the window material. The cross section of the pinhole aperture (26) is only slightly greater than the overall laser beam cross section at this location and, in particular for the planned applications in the fields of microstructuring and nanostructuring, it lies in the range of one to several ten square micrometres. The vacuum required for avoiding a plasma in the region of the focus (19) is achieved with the aid of a vacuum pump with a sufficiently high suction power. A cross jet inert gas nozzle (21) which generates a cross gas flow between the vacuum cuvette (20) and the substrate (13) is attached for protecting the window (25) of the vacuum cuvette 2 (20) from being occupied by ablated material from the substrate (13).

The beam guiding variant 1 is preferably suitable for realizing very small imaging cross sections for generating structures with detail dimensions in the micrometre and nanometre range as no further optical components, the aberration-errors of which (e.g. aberrations of lens elements) could have a negative influence on the detail accuracy of the imaging, are present after focus 1.

Beam Guiding Variant 2 in the Beam Guiding and Forming System

In the beam guiding variant 2 in accordance with FIG. 3, use is likewise made of an added lens element (16), a field lens system (8) consisting of two lens elements, and a lens (10) for example consisting of two lens elements. FIG. 3 only depicts the principal planes of the lens elements. The intermediate focus (17) of the beam path is once again situated between the added lens element (16) and the stop/mask combination (6, 7). The focus 2 (22) of the imaging optical system consisting of the field lens system (8) and the lens (10) is situated between the field lens system (8) and the lens (10) in this beam guiding variant 2, such that the vacuum cuvette (23) with two transmitting windows for the laser radiation can be used for avoiding a plasma in the region of the focus 2 (22) (see FIG. 4a); the diameter of the transmitting window surfaces must be selected to be so large that the propagation of at least the first to third order of diffraction of the diffracted laser beam components (2a) (see FIG. 3) is also possible without hindrance. The imaging plane (11) is situated on the substrate surface (12). An inert gas nozzle system (24) which generates a gas flow between the lens (10) and the substrate (13) is attached for protecting the lens (10) from being occupied by ablated material from the substrate (13).

Figure 5:
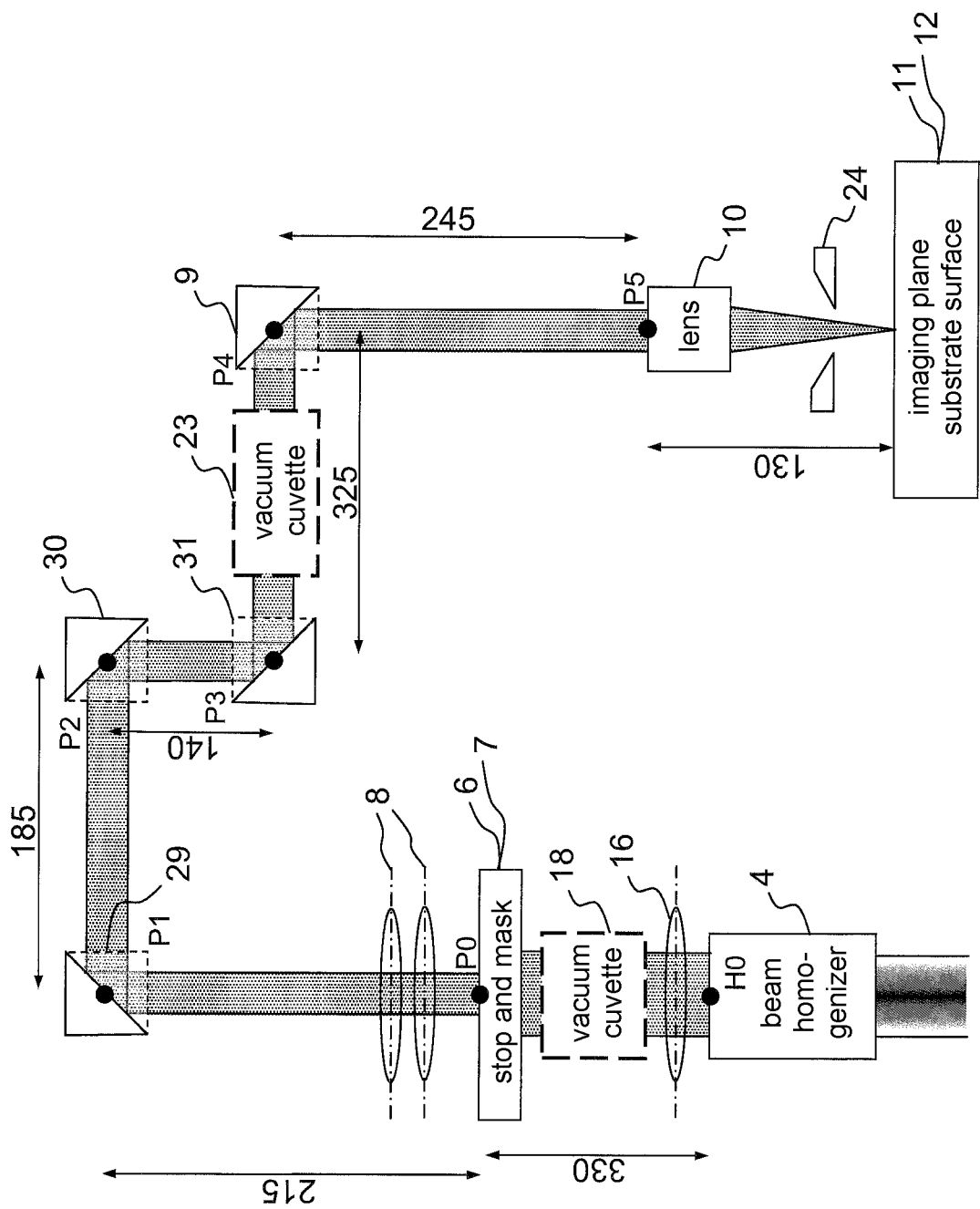
FIG. 5 shows, in an exemplary manner, the arrangement of the optical components of a realized femtosecond and picosecond laser mask projection system with four deflection mirrors for reducing the overall dimensions of the system.

The rectangles depicted by dotted lines indicate further 90° deflection mirrors (29, 30, 31), which can be used for folding the beam path and increase the compactness of the whole beam guiding and forming system (see FIG. 5).

However, if a sufficiently long space is available, the whole optical system can also be implemented without the deflection mirrors (9, 29, 30, 31).

The beam guiding variant 2 is preferably suitable for realizing relatively large imaging cross sections in the range of more than several 10 $\mu m^2$ to 1 $mm^2$.

Exemplary Embodiment: fs Laser Mask Projection, Beam Guiding Variant 2

FIG. 5 depicts an fs laser mask projection system for realizing the beam guiding variant 2 (see FIG. 3). The arrowheads with the measured values specify the distances between the optical components in millimetres. Use is made of four 90° deflection mirrors (29, 30, 31, 9) in order to achieve a compact set-up of the system and in order to enable an integration thereof into an FS-150-10 fs laser microstructuring apparatus by "3D-Mikromac AG", which is designed for microstructuring by means of the fs laser focus method. A Clark MXR CPA 2010 type laser is used as a femtosecond laser in this apparatus; said laser has the following parameters: central wavelength 775 nm, pulse duration 150 fs, pulse energy 1 mJ, pulse repetition frequency 1 kHz; beam diameter at the laser output 3 mm, Gaussian intensity distribution over the laser beam cross section. The beam diameter is increased to Rs=6 mm with the aid of the beam expander (3) and a top flat intensity distribution with a laser beam pulse fluence of 3 $mJ/cm^2$ at the homogeneous spot at the location P is formed by means of the homogenizer (4) and the added lens element (16). Here, the intensity profile of the laser beam pulse is formed at the homogeneous spot at the location P, at which the mask (7) is positioned, with the aid of the mask (6), which has a square aperture with edge lengths $a_O$=3.54 mm.

With the aid of the field lens system (8) and the imaging lens (10), which has a focal length of 100 mm, a reduced image (14) of the laser beam cross section generated by the stop (6) and of the laser beam intensity profile formed by the mask (7), with an imaging ratio of V=11:1 and with a laser beam pulse fluence of 280 $mJ/cm^2$, is generated at the image distance b=110 mm in the imaging plane (11).

Advantages of the Solution According to the Invention

As a result of the use of the fs and ps mask projection method, it is possible to generate microstructures with detail dimensions down to the sub-micrometre range. By way of example, these include optical diffraction gratings for the visible wavelength range with grating periods of 1 $\mu m$ and less. The three-dimensional microstructures preferably generated by layer-by-layer structured ablation have a high edge sharpness, a high wall steepness and low wall and base roughness. As a result of the low thermal and shockwave load on the adjacent, non-structured substrate regions, material modifications and spalling at the structure edges are largely avoided when structuring brittle materials. In the case of a sufficiently high pulse energy of the employed lasers and the possible size of the cross section of the homogeneous spot and therefore also of the mask resulting therefrom, multibeam processing in the micro-range, e.g. parallel generation of trench-shaped and frustum-shaped structures or parallel structuring or separation of thin layer stacks, can be carried out by means of the partial beams generated thus in the case of the same predetermined geometry of the transmitting mask apertures and their distance from one another.

The invention claimed is:

1. A device for mask projection of femtosecond or picosecond laser beams with an imaging plane onto a substrate surface to form microstructures in the substrate surface by laser ablation, the device comprising:
   a femtosecond or picosecond laser generating a laser beam;
   a stop with a predetermined stop aperture geometry and a mask with a predetermined mask aperture geometry;
   a field lens system and an imaging lens;
   an added lens system; and
   a vacuum cuvette including a vacuum chamber,
   wherein the laser beam includes, at a location P of an optical axis, laser beam pulses with an expanded laser beam cross section or laser beam pulses with a reduced laser beam cross section, the laser beam having a homogeneous intensity distribution over a laser beam cross section,
   wherein the stop and the mask are positioned in succession in at the location P of the optical axis,
   wherein the field lens system and the imaging lens are positioned such that non-diffracted and diffracted beam components of the laser beam pulses transmitted by the stop and the mask are directed into the imaging lens with a predetermined aperture by the field lens system such that a reduced image, having a predetermined imaging ratio generated by the stop and the mask, is generated over the laser beam cross section of the laser beam pulses in the imaging plane,
   wherein the imaging plane situated on or in proximity to the substrate surface to perform the laser ablation,
   wherein the added lens system, the field lens system, and the imaging lens are positioned relative to one another such that a laser focus is generated between the imaging lens and the substrate surface, and
   wherein a location of the laser focus is arranged inside the vacuum chamber for preventing plasma formation, and a location of the imaging plane that performs the laser ablation is not located inside the vacuum chamber.

2. The device according to claim 1, further comprising:
   a 90° deflection mirror arranged between the field lens system and the imaging lens.

3. The device according to claim 1, further comprising:
   a device for varying distances between a principal plane of the imaging lens and the substrate surface,
   wherein the device is configured to selectively place the imaging plane over or under the substrate surface by varying distances between the principal plane of the imaging lens and the substrate surface at a predetermined position, the predetermined position defined as a distance of an image distance b from the principal plane of the imaging lens.

4. The device according to claim 3, wherein the device for varying distances between a principal plane of the imaging lens and the substrate surface includes a xyz-coordinate table that is configured to modify a z-axis, the substrate fastened to the xyz-coordinate table.

5. The device according to claim 3, wherein the device for varying distances between a principal plane of the imaging lens and the substrate surface includes:
   a linear displacement device for performing linear displacement along a linear axis, configured to move the field lens system attached to the linear displacement device along a predetermined path along the optical axis.

6. The device according to claim 3, wherein the device for varying distances between a principal plane of the imaging lens and the substrate surface includes:
   a linear displacement device for performing linear displacement along a linear axis, configured to move the imaging lens attached to the linear displacement device along a predetermined path along the optical axis.

7. The device according to claim 1, wherein a cross jet inert gas nozzle is arranged between the vacuum cuvette and the substrate surface.

8. The device according to claim 1, wherein apertures of optical components of the field lens system, the imaging lens, and the vacuum cuvette are selected to be such that, from a first to a third order of diffraction, the laser beam components which were diffracted as a result of the predetermined mask aperture geometry of the mask are also imaged on the substrate surface.

9. The device according to claim 1, wherein the laser is operated in burst mode.

10. The device according to claim 1, further comprising:
    a beam expander or a beam cross section reducer; and
    a device, positioned between the laser and the beam expander or beam cross section reducer, for generating a second harmonic (frequency doubling, SHG),
    wherein the femtosecond laser beam pulses or the picosecond laser beam pulses respectively pass through the device for generating the second harmonic (frequency doubling, SHG) after emerging from the laser, and
    wherein at least one of the beam expander and beam cross section reducer, the added lens system, the stop, the mask, the field lens system, the imaging lens, and the vacuum cuvette are configured to transmit a generated photon radiation with half of a fundamental wavelength.

11. The device according to claim 1, further comprising:
    a beam expander or a beam cross section reducer; and
    a device, positioned between the laser and the beam expander or beam cross section reducer, for generating a third harmonic (frequency tripling, THC),
    wherein the femtosecond laser beam pulses or the picosecond laser beam pulses respectively pass through the device for generating the third harmonic (frequency tripling, THC) after emerging from the laser, and
    wherein at least one of the beam expander and beam cross section reducer, the added lens system, the stop, the mask, the field lens system, the imaging lens, and the vacuum cuvette are configured to transmit a generated photon radiation with third of a fundamental wavelength.

12. The device according to claim 1, further comprising:
    a beam expander or a beam cross section reducer; and
    a device, positioned between the laser and the beam expander or beam cross section reducer, for generating the fourth harmonic (frequency quadrupling, FHG),
    wherein the femtosecond laser beam pulses or the picosecond laser beam pulses respectively pass through the device for generating the fourth harmonic (frequency quadrupling, FHG) after emerging from the laser, and
    wherein at least one of the beam expander and beam cross section reducer, the added lens system, the stop, the mask, the field lens system, the imaging lens, and the vacuum cuvette are configured to transmit a generated photon radiation with a quarter of a fundamental wavelength.

13. The device according to claim 1, wherein a diameter of the laser beam cross section of the laser beam pulses of the imaging plane at the substrate surface is less than 1 µm, or an area of the laser beam cross section of the laser beam pulses of the imaging plane at the substrate surface is less than 1 µm$^2$, with a central laser beam fundamental wavelengths in a range between 775 nm and 1064 nm.

14. The device according to claim 1, wherein at a pulse energy of the laser beams pulses of at least 1 mJ, the laser beam pulses are configured to generate a predetermined microstructure on the substrate surface over the entire laser beam cross section.

15. A device for mask projection of femtosecond or picosecond laser beams with an imaging plane onto a substrate surface to form microstructures in the substrate surface by laser ablation, the device comprising:
- a femtosecond or picosecond laser generating a laser beam;
- a stop with a predetermined stop aperture geometry and a mask with a predetermined mask aperture geometry;
- a field lens system and an imaging lens;
- an added lens system; and
- a vacuum cuvette including a vacuum chamber,
- wherein the laser beam includes, at a location P of an optical axis, laser beam pulses with an expanded laser beam cross section or laser beam pulses with a reduced laser beam cross section, the laser beam having a homogeneous intensity distribution over a laser beam cross section, the stop and the mask positioned in succession in at the location P of the optical axis,
- wherein the field lens system and the imaging lens are positioned such that non-diffracted and diffracted beam components of the laser beam pulses transmitted by the stop and the mask are directed into the imaging lens with a predetermined aperture by the field lens system such that a reduced image, having a predetermined imaging ratio generated by the stop and the mask, is generated over the laser beam cross section of the laser beam pulses in the imaging plane,
- wherein the imaging plane situated on or in proximity to the substrate surface to perform the laser ablation,
- wherein the added lens system, the field lens system, and the imaging lens are positioned relative to one another such that a laser focus is generated between the field lens system and the imaging lens, and
- wherein the region of the laser focus is arranged inside the vacuum chamber for preventing plasma formation, and a location of the imaging plane that performs the laser ablation is not located inside the vacuum chamber.

16. The device according to claim 15, wherein an inert gas nozzle system is arranged between the imaging lens and the substrate surface.

17. The device according to claim 15, further comprising:
- an additional vacuum cuvette with a vacuum chamber is arranged at an intermediate laser focus between the added lens system and the stop, a location of the intermediate laser focus arranged inside the vacuum chamber for preventing plasma formation.

18. The device according to claim 1, further comprising:
- an additional vacuum cuvette with a vacuum chamber is arranged at an intermediate laser focus between the added lens system and the stop and the mask, a location of the intermediate laser focus arranged inside the vacuum chamber for preventing plasma formation.

19. The device according to claim 17, wherein the additional vacuum cuvette includes two-parallelly arranged windows held by a hollow spacer.

20. The device according to claim 18, wherein the additional vacuum cuvette includes two-parallelly arranged windows held by a hollow spacer.

21. The device according to claim 1, wherein the vacuum cuvette includes a pinhole aperture at a side facing the substrate surface.

22. The device according to claim 15, wherein the vacuum cuvette includes a pinhole aperture at a side facing the substrate surface.

* * * * *